(12) United States Patent
Nakanishi et al.

(10) Patent No.: US 7,554,622 B2
(45) Date of Patent: Jun. 30, 2009

(54) LIQUID CRYSTAL DISPLAY DEVICE

(75) Inventors: Yohei Nakanishi, Tenri (JP); Hidefumi Yoshida, Kanagawa (JP); Yasutoshi Tasaka, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 364 days.

(21) Appl. No.: 11/387,759

(22) Filed: Mar. 24, 2006

(65) Prior Publication Data

US 2007/0008444 A1  Jan. 11, 2007

(30) Foreign Application Priority Data

Mar. 29, 2005 (JP) ............................. 2005-095155

(51) Int. Cl.
*G02F 1/136* (2006.01)
*G02F 1/1343* (2006.01)

(52) U.S. Cl. .................. 349/48; 349/38; 349/39; 349/42; 349/129; 349/130

(58) Field of Classification Search .................. 349/48, 349/42, 38–39, 129–130
See application file for complete search history.

(56) References Cited

U.S. PATENT DOCUMENTS

| | | | |
|---|---|---|---|
| 4,840,460 A | 6/1989 | Bernot et al. | |
| 5,126,865 A | 6/1992 | Sarma | |
| 6,366,755 B1 | 4/2002 | Takashima | |
| 7,206,048 B2 * | 4/2007 | Song ........................... 349/129 |
| 2006/0103800 A1 | 5/2006 | Li et al. | |
| 2006/0228134 A1 | 10/2006 | Ishiguro et al. | |
| 2008/0031657 A1 | 2/2008 | Okuda et al. | |

FOREIGN PATENT DOCUMENTS

| | | |
|---|---|---|
| JP | 2-12 | 1/1990 |
| JP | 04-174467 | 6/1992 |
| JP | 3076938 | 6/2000 |
| JP | 2002-278257 A | 9/2002 |
| JP | 2005-49850 A | 2/2005 |
| JP | 2005-165003 | 6/2005 |

OTHER PUBLICATIONS

U.S. Office Action mailed Apr. 21, 2008 in co-pending U.S. Appl. No. 11/826,426.

* cited by examiner

*Primary Examiner*—Frank G Font
*Assistant Examiner*—Guy G Anderson
(74) *Attorney, Agent, or Firm*—Nixon & Vanderhye P.C.

(57) ABSTRACT

In a liquid crystal display device in which in order to prevent image sticking in a half tone type MVA using a floating sub-pixel, a second TFT is provided between a sub-pixel directly connected to a TFT and the floating sub-pixel, its alignment is improved and a display quality is improved. A control capacitance electrode of an adjacent pixel is extended to provide an alignment control electrode in a corner portion of a pixel in which a propagation distance of liquid crystal alignment is long, and the propagation distance of the liquid crystal alignment is shortened, and at the same time, a slit part is formed of electrodes different from each other in voltage polarity to stabilize the alignment.

3 Claims, 9 Drawing Sheets

LIQUID CRYSTAL DISPLAY DEVICE

BACKGROUND OF THE INVENTION

1. Field of the Invention

The present invention relates to a liquid crystal display device including plural sub-pixel electrodes in one pixel region and improved in alignment of liquid crystal molecules, and particularly to a liquid crystal display device in which at least one sub-pixel electrode is capacitance coupled to a control electrode to which a display voltage is applied, and is connected through a second TFT to a sub-pixel electrode directly driven by the control electrode in order to prevent image sticking.

2. Description of the Related Art

As compared with a CRT (Cathode Ray Tube), a liquid crystal display device has merits that it is thin, is lightweight, is driven by a low voltage, and has small electric power consumption. Thus, the liquid crystal display device is used for various electric equipments such as a television, a notebook PC (Personal Computer), a desktop PC, PDA (Personal Digital Assistant) and a cellular phone. Especially, an active matrix liquid crystal display device in which a TFT (Thin Film Transistor) as a switching element is provided for each pixel (sub-pixel) exhibits an excellent display characteristic comparable to the CRT because of its high drive performance, and has been widely used for the field in which the CRT is conventionally used, such as the desktop PC or the television.

In general, the liquid crystal display device includes two substrates, and a liquid crystal sealed between these substrates. A pixel electrode, a TFT and the like are formed for each pixel on one of the substrates, and a color filter opposite to the pixel electrode and a common electrode common to respective pixels are formed on the other substrate. There are three kinds of red (G), green (G) and blue (B) color filters, and a color filter of one of the colors is disposed for each pixel. Three pixels of red (R), green (G) and blue (B) disposed to be adjacent to each other form one picture dot. Hereinafter, the substrate on which the pixel electrode and the TFT are formed will be called a TFT substrate, and the substrate disposed to be opposite to the TFT substrate will be called an opposite substrate. A structure in which a liquid crystal is sealed between the TFT substrate and the opposite substrate will be called a liquid crystal panel.

Conventionally, a TN (Twisted Nematic) liquid crystal display device has been widely used in which a horizontal alignment type liquid crystal (liquid crystal with a positive dielectric anisotropy) is sealed between two substrates, and liquid crystal molecules are twist-aligned. However, the TN liquid crystal display device has defects that a viewing angle characteristic is poor, and the contrast and color tone are significantly changed when the screen is seen from an oblique direction. Thus, an MVA (Multi-domain Vertical Alignment) liquid crystal display device excellent in the viewing angle characteristic is developed and is put to practical use.

However, in the conventional MVA liquid crystal display device, there occurs a phenomenon in which a screen looks whitish when viewed from an oblique direction. FIG. 2 is a view showing a T-V (Transmittance-Voltage) characteristic when a screen is seen from the front, and a T-V characteristic when viewed from an upward direction of 60°, while the horizontal axis indicates the applied voltage (V) and the vertical axis indicates the transmittance. As shown in FIG. 2, when a voltage slightly higher than a threshold voltage is applied to a pixel electrode (portion encircled by a circle in the figure), the transmittance when viewed from the oblique direction becomes higher than the transmittance when viewed from the front. When the applied voltage is increased in some degree, the transmittance when viewed from the oblique direction becomes lower than the transmittance when viewed from the front. Thus, when viewed from the oblique direction, a brightness difference among a red pixel, a green pixel, and a blue pixel becomes small, and consequently, as described before, there occurs a phenomenon in which the screen looks whitish. This phenomenon is called "discolor". The discolor occurs not only in the MVA liquid crystal display device but also in the TN liquid crystal display device.

U.S. Pat. No. 4,840,460 proposes that one pixel is divided into plural sub-pixels, and those sub-pixels are capacitance coupled to each other. In such a liquid crystal display device, since a potential is divided according to the capacitance ratio of the respective sub-pixels, voltages different from each other can be applied to the respective sub-pixels. Accordingly, seemingly, plural regions different in the threshold of the T-V characteristic exist in one pixel. When the plural regions different in the threshold of the T-V characteristic exist in one pixel as stated above, the phenomenon in which the transmittance obtained when viewed from the oblique direction becomes higher than the transmittance obtained when viewed from the front is suppressed, and consequently, the phenomenon (discolor) in which the screen looks whitish is also suppressed. The method in which one pixel is divided into plural capacitance-coupled sub-pixels to improve the display characteristic is called an HT (Half Tone gray scale) method. Incidentally, the liquid crystal display device disclosed in U.S. Pat. No. 4,840,460 is a TN liquid crystal display device.

Japanese Patent No. 3076938 (JP-A-5-66412) discloses a TN liquid crystal display device in which a pixel electrode is divided into plural sub-pixel electrodes, and a control electrode is disposed below each of the sub-pixel electrodes through an insulating film. In this liquid crystal display device, a display voltage is applied to the control electrode through a TFT. Since sizes of the respective sub-pixel electrodes are different from each other, voltages applied to the sub-pixel electrodes are also different from each other, and the effect by the HT method, that is, the effect to suppress the discolor can be obtained.

FIG. 3 shows a structure of one pixel of a conventional MVA liquid crystal display device using a capacitive coupling HT method. As shown in FIG. 3, a TFT substrate of the liquid crystal display device includes plural gate bus lines 12 formed on a glass substrate 10 (not shown in FIG. 3), and plural drain bus lines 14 formed to intersect with the gate bus lines 12 through an insulating film 30 (not shown in FIG. 3). A first TFT 20 formed as a switching element for each pixel is disposed in the vicinity of an intersection position of the gate bus line 12 and the drain bus line 14. A gate electrode 23 of the first TFT 20 is electrically connected to the gate bus line 12, and a drain electrode 21 is electrically connected to the drain bus line 14. A storage capacitor bus line 18 is formed to cross a pixel region defined by the gate bus line 12 and the drain bus line 14 and to extend in parallel to the gate bus line 12. A storage capacitor electrode (intermediate electrode) 19 is formed above the storage capacitor bus line 18 through the insulating film 30 for each pixel. The storage capacitor electrode 19 is electrically connected to a source electrode 22 of the first TFT 20 through a control capacitance electrode 25. A storage capacitor Cs is formed between the storage capacitor bus line 18 and the storage capacitor electrode 19.

The pixel region includes a sub-pixel A and a sub-pixel B. The sub-pixel A has, for example, a trapezoidal shape, and is disposed at the center of the pixel region and close to the left thereof. The sub-pixel B is disposed at the upper part, the lower part and the center right end part of the pixel region except the region of the sub-pixel A. Each of the sub-pixels A and B is substantially linearly symmetrical with respect to the storage capacitor bus line 18. A pixel electrode 16 is formed in the sub-pixel A, and a pixel electrode 17 separated from the pixel electrode 16 is formed in the sub-pixel B. The pixel electrode 16 is electrically connected to the storage capacitor electrode 19 and the source electrode 22 of the TFT 20 through a contact hole 24. On the other hand, the pixel electrode 17 is electrically in a floating state. The pixel electrode 17 has a region overlapping with the control capacitance electrode 25 through a protection film 31 (not shown in FIG. 3), and is indirectly connected to the source electrode 22 by capacitive coupling through a control capacitance Cc formed in the region.

A linear slit (blank part of an electrode) 44 extending obliquely to the pixel region end part is formed between the pixel electrodes 16 and 17. The slit 44 separates the pixel electrodes 16 and 17 from each other and functions also as an alignment regulating structure to regulate the alignment of a liquid crystal 6 (not shown in FIG. 3).

An opposite substrate disposed to be opposite to the TFT substrate through a liquid crystal layer includes a common electrode 41 (not shown in FIG. 3) formed on a glass substrate 11. A liquid crystal capacitance C1c1 is formed between the pixel electrode 16 of the sub-pixel A and the common electrode 41, and a liquid crystal capacitance C1c2 is formed between the pixel electrode 17 of the sub-pixel B and the common electrode 41. Linear protrusions 42 extending in parallel to the slit 44 and functioning as alignment regulating structures are formed on the common electrode 41. The linear protrusions 42 are disposed almost at the centers of the sub-pixels A and B in order to substantially equally divide the respective sub-pixels A and B into regions where alignment directions of the liquid crystal are different. The control capacitance electrode 25 to connect the source electrode 22 and the storage capacitor electrode 19 is disposed to overlap with the linear protrusions 42 when viewed vertically to the substrate surface. A light shielding film (BM) (not shown in FIG. 3) to shield the pixel region end part against light is formed on the opposite substrate.

It is assumed that the TFT 20 is brought into an on state, a voltage is applied to the pixel electrode 16, and a voltage Vpx1 is applied to the liquid crystal layer of the sub-pixel A. At this time, since the potential is divided in accordance with the capacitance ratio of the liquid crystal capacitance C1c2 and the control capacitance Cc, a voltage different from that of the pixel electrode 16 is applied to the pixel electrode 17 of the sub-pixel B. A voltage Vpx2 applied to the liquid crystal layer of the sub-pixel B becomes Vpx2=(Cc/(C1c2+Cc))× Vpx1. As stated above, in the liquid crystal display device having the pixel structure shown in FIG. 3, since the voltage Vpx1 applied to the liquid crystal layer of the sub-pixel A and the voltage Vpx2 applied to the liquid crystal layer of the sub-pixel B can be made different from each other in one pixel, the viewing angle characteristic can be improved.

Besides, in order to discharge an unnecessary storage charge which causes image sticking of the sub-pixel B, a second TFT 60 is provided. The gate bus line 12 serves also as a gate electrode of the TFT 60. An operational semiconductor layer (not shown) is formed on the gate electrode, and a channel protection film 28 is formed on the operational semiconductor layer. A source electrode 62 and a drain electrode 63 are formed on the channel protection film 28. The sub-pixel B is electrically connected to the source electrode 62 through a contact hole 64, and a portion extended from the control capacitance electrode 25 forms the drain electrode 63.

The second TFT 60 is turned ON just before a specified voltage is written by the first TFT 20 into the respective pixel electrodes 16 and 17, and the pixel electrodes 16 and 17 are electrically connected to each other. Since the specified voltage is written into the pixel electrode 16 through the first TFT 20, an unnecessary charge is not cumulatively stored in the pixel electrode 17, and image sticking is prevented.

[Patent document 1] U.S. Pat. No. 4,840,460
[Patent document 2] Japanese Patent No. 3076938

The MVA type is designed such that when voltage is applied to liquid crystal molecules, the liquid crystal molecules are tilted by a slit or a bank, and the tilt is propagated so that the liquid crystal molecules of the whole pixel are tilted in a specified direction. However, when a propagation distance is long, there appears a liquid crystal molecule which falls in a direction different from the propagation direction before the alignment direction is propagated, and the alignment of the whole liquid crystal molecules is disturbed. Especially in a corner portion of each pixel, the propagation distance becomes long and the alignment is likely to be disturbed.

FIG. 3 shows a conventional example. A minute slit 46a is especially long at the corner portion of the pixel. Thus, the liquid crystal molecules on the minute slit 46a can fall in a direction opposite to the specified direction. A boundary between a region where the liquid crystal molecules fall in the specified direction and a region where the liquid crystal molecules fall in the direction opposite to the specified direction becomes a dark line. This dark line does not disappear unless all the liquid crystal molecules are re-aligned in the specified direction, and that can take several seconds or longer. When there is a pixel in which such a dark line is formed in a part of the liquid crystal display device, only the pixel looks slightly dark and causes a decrease in display quality, such as an afterimage.

Besides, since the potential of the gate bus line is lower than that of the pixel electrode by several volts to ten and several volts in almost all time, a large potential difference is generated between the gate bus line and the pixel electrode in the horizontal direction, and becomes one of factors of liquid crystal alignment disturbance. Although the second TFT 60 and the contact hole 64 of the sub-pixel A are provided in the vicinity of the gate bus line 12, as shown in FIG. 3, the minute slit can not be provided in the portion where the contact hole 64 is provided, and the portion is remote from the linear protrusion 42. Thus, liquid crystal molecules tilted in a direction different from the specified direction are increased. When the liquid crystal molecules are tilted in a direction different from the specified direction, a dark region is generated according to the tilt direction, or a boundary between regions where the liquid crystal molecules are tilted in different directions becomes a dark line. It takes several seconds before the liquid crystal molecules are re-aligned in the specified direction and the dark region or the dark line disappears, and that becomes a cause of a decrease in display quality, such as an afterimage.

SUMMARY OF THE INVENTION

It is an object of the invention to provide in a liquid crystal display device in which a second TFT 60 is provided between a sub-pixel directly connected to a TFT and a floating sub-pixel in order to prevent image sticking in an MVA type with a half tone method using a floating sub-pixel, the alignment is improved and display quality is improved. FIG. 1 shows a principle structural view. There are provided a first and a second substrates disposed to be opposite to each other, a liquid crystal sealed between the first and the second substrates, a gate bus line 12 and a data bus line 14 formed on the first substrate, a first TFT 20 connected to the gate bus line 12 and the data bus line 14, a plurality of sub-pixel electrodes formed in a pixel region defined by the gate bus line 12 and the data bus line 14, and a control electrode which is capacitance coupled to at least one of the plurality of sub-pixel electrodes and to which a displayed voltage is applied from the data bus line 14 through the first TFT 20. Further, there is provided a second TFT 60 which is driven by a signal flowing through a gate bus line different from the gate bus line 12 to which the TFT 20 is connected. Here, the second TFT 60 causes a short circuit between "the sub-pixel electrode capacitance-coupled to the control electrode" and "an auxiliary capacitance bus line 18*a* kept at a specific potential and constituting an auxiliary capacitance between itself and the control electrode" or causes a short circuit between "the sub-pixel electrode capacitance-coupled to the control electrode" and "the sub-pixel electrode connected to the first TFT 20". The control electrode of a pixel adjacent to a corner portion of each pixel, which has been a cause of alignment disturbance of liquid crystal molecules since the propagation distance is long, is extended and is disposed.

A triangular alignment control electrode 65 is disposed in a place where the minute slit 46*a* exists in the conventional structure of FIG. 3. The alignment control electrode 65 is electrically connected to a source electrode 62 of the second TFT 60 provided between sub-pixels A and B of adjacent pixels. A slit 48 is formed between the alignment control electrode 65 and a pixel electrode 17*a*. An extension part 66*a* of the alignment control electrode 65 crosses the gate bus line 12 and is electrically connected to a pixel electrode 17*c* in a contact hole 64.

A first function is to shorten a distance in which the tilt of liquid crystal molecules is propagated and to prevent the liquid crystal molecules from being tilted in a direction other than a specified direction. In the conventional structure shown in FIG. 3, although the minute slit 46*a* exists, since the distance in which the tilt of liquid crystal molecules is propagated is long, the alignment is disturbed. On the other hand, in this embodiment, the slit 48 is formed, so that the distance in which the tilt of liquid crystal molecules is propagated becomes short, the liquid crystal molecules are not tilted in a direction other than the specified direction, and the alignment becomes stable.

A second function is obtained by a lateral electric field between the alignment control electrode 65 and the pixel electrode 17*a*. When dot inversion drive is performed, in case a common electrode 41 has a reference potential, potentials of the alignment control electrode 65 and the pixel electrode 17*a* are in a relation of reverse polarity. Accordingly, a lateral electrode field having a potential difference at least twice as high as the voltage for black is always generated between the alignment control electrode 65 and the pixel electrode 17*a*. By this lateral electric field, the liquid crystal molecules on the slit 48 keep a state where they stand in the vertical direction to the substrate. Even if liquid crystal molecules are tilted in a direction different from the specified direction, the propagation thereof does not overpass the slit 48. In order to enable the tilt of the liquid crystal molecules to be propagated, a vertical electric field must be generated between the common electrode 41 and the pixel electrodes 16 and 17 so that a force to tilt the liquid crystal molecules is applied. However, since the force to tile is not exerted on the liquid crystal molecules in the lateral electric field, the liquid crystal molecules are not tilted, and accordingly, the tilt direction can not be propagated. Especially, since the gate bus line has generally a potential lower than the pixel electrode by several volts to ten and several volts, in the vicinity of the gate bus line, the lateral electric field is generated in a direction different from the specified alignment direction, and the liquid crystal molecules are tilted in the direction different from the specified direction. However, the propagation is blocked by the slit 48, and the alignment of the liquid crystal molecules on the pixel electrode 17*a* is stabilized.

As stated above, the above object is achieved by a liquid crystal display device including a first and a second substrates disposed to be opposite to each other, a liquid crystal sealed between the first and the second substrates, a gate bus line and a data bus line formed on the first substrate, a first TFT connected to the gate bus line and the data bus line, a plurality of sub-pixel electrodes formed in a pixel region defined by the gate bus line and the data bus line, a control electrode which is capacitance coupled to at least one of the plurality of sub-pixel electrodes and to which a display voltage is applied from the data bus line through the first TFT, an auxiliary capacitance bus line kept at a constant potential and constituting an auxiliary capacitance between itself and the control electrode, and a second TFT 60 which is disposed between the sub-pixel electrode capacitance-coupled to the control electrode and the auxiliary capacitance bus line or between the sub-pixel electrode capacitance-coupled to the control electrode and the sub-pixel electrode connected to the first TFT and which is driven by a signal flowing through a gate bus line different from the gate bus line to which the TFT is connected, wherein a connection part between the second TFT 60 and the sub-pixel electrode is provided in a corner portion of each pixel, which has been a cause of alignment disturbance of liquid crystal molecules since the propagation distance is long, and a slit is formed in the pixel electrode forming the connection part and in the vicinity of the connection part so as to have an alignment control function.

According to the invention, a liquid crystal display device can be realized in which an excellent display characteristic, especially an excellent display without an afterimage can be obtained.

DETAILED DESCRIPTION OF THE INVENTION

First Embodiment

Figure 4:
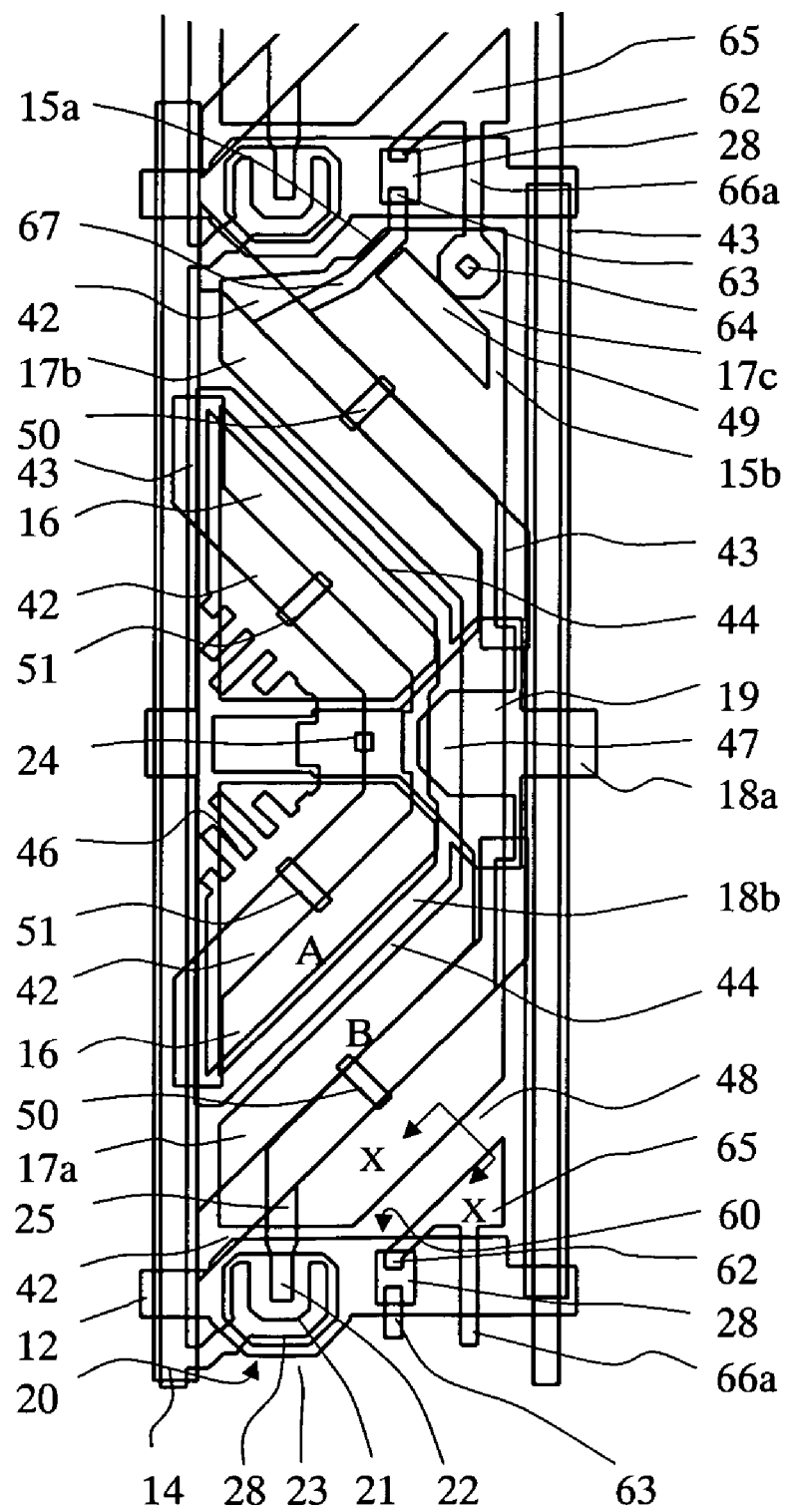
FIG. 4 is a view showing a rough structure of a pixel of a liquid crystal display device of a first embodiment of the invention.
Figure 5:
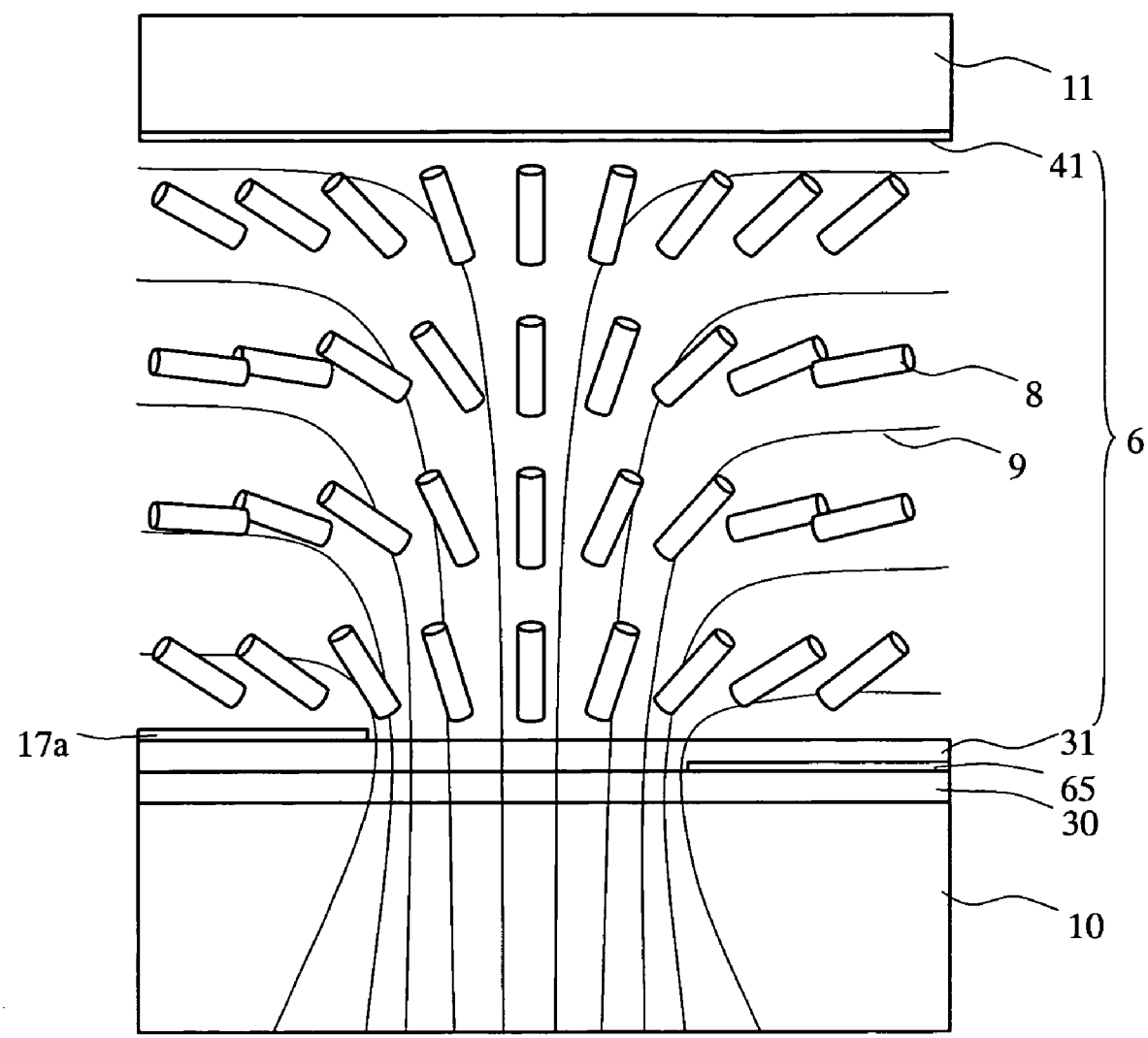
FIG. 5 is a sectional view of the liquid crystal display device of the first embodiment of the invention.

A liquid crystal display device according to a first embodiment of the invention will be described with reference to FIGS. 4, 5 and 7. FIG. 4 shows the rough structure of the liquid crystal display device of this embodiment. As shown in FIG. 4, the liquid crystal display device includes a TFT substrate 2 having a gate bus line 12 and a drain bus line 14 formed to intersect with each other through an insulating film, a TFT formed for each pixel and a pixel electrode. Besides, the liquid crystal display device includes an opposite substrate 4 which is disposed to be opposite to the TFT substrate 2 and on which a CF and a common electrode are formed, and a liquid crystal 6 (not shown in FIG. 4) sealed between both the substrates 2 and 4 and having, for example, a negative dielectric anisotropy. Vertical alignment films (not shown) to cause the liquid crystal 6 to be vertically aligned are formed on interfaces between the liquid crystal 6 and the TFT substrate 2 and between the liquid crystal 6 and the opposite substrate 4.

Figure 7:
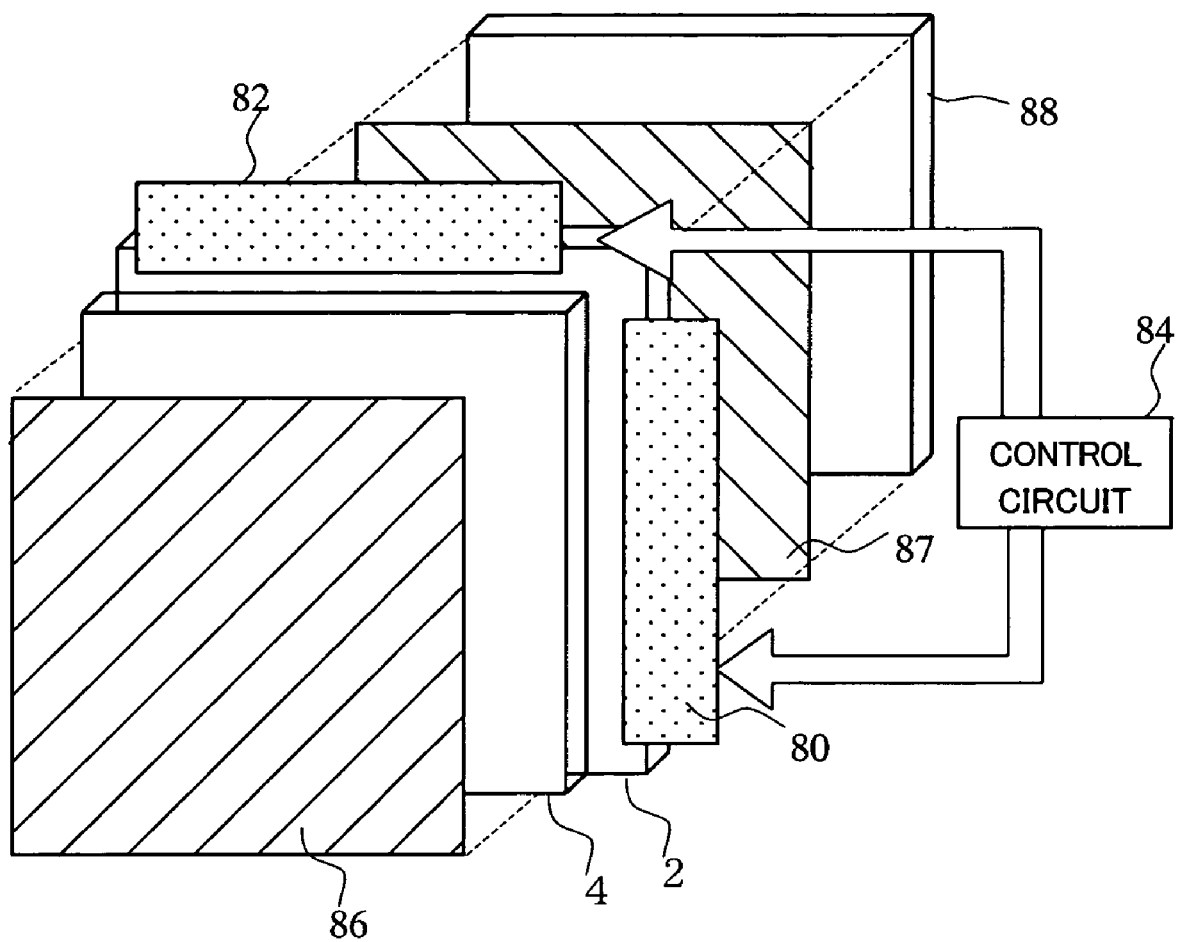
FIG. 7 is a view showing a rough structure of the liquid crystal display device of the first embodiment of the invention.

As shown in FIG. 7, the TFT substrate 2 is connected with a gate bus line drive circuit 80 in which a driver IC to drive plural gate bus lines is mounted and a drain bus line drive circuit 82 in which a driver IC to drive plural drain bus lines is mounted. These drive circuits 80 and 82 are designed to output a scanning signal or a data signal to a specified gate bus line or a drain bus line based on a specified signal outputted from a control circuit 84. A polarizing plate 87 is disposed at a surface of the TFT substrate 2 opposite to a TFT element formation surface. A polarizing plate 86 disposed in crossed Nicols with respect to the polarizing plate 87 is disposed at a surface of the opposite substrate 4 opposite to a common electrode formation surface. A backlight unit 88 is disposed at a surface of the polarizing plate 87 opposite to a surface confronting the TFT substrate 2.

FIG. 4 shows a structure of one pixel of an MVA liquid crystal display device using a capacitive coupling HT method, as the liquid crystal display device of this embodiment, and portions of adjacent upper and lower pixels. FIG. 5 shows a sectional structure of the liquid crystal display device cut along line X-X of FIG. 4, and the alignment of liquid crystal molecules. As shown in FIG. 5, the TFT substrate 2 of the liquid crystal display device is formed on a glass substrate 10, and includes plural gate bus lines 12 extending in the horizontal direction in FIG. 4, and plural drain bus lines 14 formed to intersect with the gate bus lines 12 through an insulating film 30 and extending in the vertical direction in FIG. 4. A first TFT 20 formed as a switching element for each pixel is disposed in the vicinity of an intersection position of the gate bus line 12 and the drain bus line 14. A gate electrode 23 of the first TFT 20 is electrically connected to the gate bus line 12. An operational semiconductor layer (not shown) is formed on the gate electrode 23, and a channel protection film 28 is formed on the operational semiconductor layer. A rod-like source electrode 22 and a C-shaped drain electrode 21 to surround the source electrode 22 through a specified interval are formed on the channel protection film 28. The drain electrode 21 is electrically connected to the drain bus line 14. A protection film 31 is formed on the whole surface of the substrate on the source electrode 22 and the drain electrode 21.

A storage capacitor bus line 18 is formed which crosses a pixel region defined by the gate bus line 12 and the drain bus line 14 and extends in parallel to the gate bus line 12. A storage capacitor electrode 19 is formed for each pixel on the storage capacitor bus line 18 through the insulating film 30. The storage capacitor electrode 19 is electrically connected to the source electrode 22 of the first TFT 20 through a control capacitance electrode 25. A storage capacitor Cs is formed between the storage capacitor bus line 18 and the storage capacitor electrode 19.

The pixel region includes a sub-pixel A and a sub-pixel B. The sub-pixel A has, for example, a trapezoidal shape, and is disposed at the center of the pixel region and close to the left thereof. The sub-pixel B is disposed at the upper part, the lower part and the center right end part in FIG. 4 except the sub-pixel A in the pixel region. Each of the sub-pixels A and B is disposed to be almost linearly symmetrical with respect to the storage capacitor bus line 18 in one pixel. A pixel electrode 16 is formed in the sub-pixel A, and a pixel electrode 17 separated from the pixel electrode 16 is formed in the sub-pixel B. In FIG. 4, for convenience, the pixel electrode 17 is divided into a part 17a lower than the storage capacitor bus line, a part 17b upper than the storage capacitor bus line, and a part 17c where a contact hole 24 is formed. The parts 17a and 17b are electrically connected to each other, and the part 17b is electrically connected to the part 17c through connection parts 15a and 15b. Except where specifically noted, the pixel electrode 17 indicates all of the parts 17a, 17b and 17c. Both the pixel electrodes 16 and 17 are made of, for example, transparent conductive films, and are formed in the same layer. The pixel electrode 16 is electrically connected to the source electrode 22 of the TFT 20 through the contact hole 24 opened in the protection film 31 on the storage capacitor electrode 19. On the other hand, the pixel electrode 17 is electrically in a floating state. The pixel electrode 17 includes regions opposite to the control capacitance electrode 25 through the protection film 31 at the upper part and the lower part of the pixel region in FIG. 4. The pixel electrode 17 is indirectly connected to the source electrode 22 by capacitive coupling through a control capacitance Cc of the control capacitance part formed in the region.

The pixel electrodes 16 and 17 are separated from each other by slits 44 and 47 surrounding three sides of the trapezoidal pixel electrode 16 so as to form a C shape. The slit 44 extends obliquely to the end part of the pixel region, and the slit 47 extends along the right end part of the pixel region. The slit 44 functions also as an alignment regulating structure to regulate the alignment of the liquid crystal 6. It is necessary that the widths of the slits 44 and 47 are made sufficiently thick so that the pixel electrodes 16 and 17 are not electrically shorted (for example, 10 μm or more).

The opposite substrate 4 disposed to be opposite to the TFT substrate 2 through the liquid crystal 6 includes a common electrode (opposite electrode) 41 formed on a glass substrate 11. A liquid crystal capacitance C1c1 is formed between the pixel electrode 16 of the sub-pixel A and the common electrode 41 opposite to each other through the liquid crystal 6. Similarly, a liquid crystal capacitance C1c2 is formed between the pixel electrode 17 of the sub-pixel B and the common electrode 41. A bank-like linear protrusion (resin structure) 42 extending in parallel to the slit 44 and obliquely to the end part of the pixel region and functioning as an alignment regulating structure is formed on the common electrode 41. The slit 44 and the linear protrusion 42 extend in a direction to form an angle of about 45° with respect to the polarizing axes of the polarizing plates 86 and 87 disposed at the outsides of the TFT substrate 2 and the opposite substrate 4. The linear protrusion 42 is formed of a positive resist material such as novolac resin. For example, the height of the linear protrusion 42 is 1.0 μm, and the width is 10 μm. The linear protrusion 42 is disposed almost at the center of each of the sub-pixels A and B in order to equally divide each of the sub-pixels A and B into regions different in the alignment direction of the liquid crystal 6. The linear protrusion 42 is disposed to be almost linearly symmetrical with respect to the storage capacitor bus line 18 in one pixel. By this, the liquid crystal 6 of the sub-pixels A and B is aligned almost uniformly in four directions perpendicular to each other in one pixel. The control capacitance electrode 25 to connect the source electrode 22 and the storage capacitor electrode 19 is disposed to overlap with the linear protrusion 42 when viewed vertically to the substrate surface.

An auxiliary protrusion 43 is formed in the vicinity of a region where the linear protrusion 42 intersects with the end parts of the pixel electrodes 16 and 17 and an obtuse angle is formed between the direction in which the linear protrusion 42 extends when viewed vertically to the substrate surface and the end parts of the pixel electrodes 16 and 17. The auxiliary protrusion 43 is formed in, for example, the same layer as the linear protrusion 42, and extends almost in parallel to the drain bus line 14. The auxiliary protrusion 43 is provided so as to cancel the influence of the electric field in the vicinity of the end parts of the pixel electrodes 16 and 17, and is disposed to overlap with the end parts of the pixel electrodes 16 and 17 when viewed vertically to the substrate surface.

It is assumed that the TFT 20 is brought into an on state, a voltage is applied to the pixel electrode 16, and a voltage Vpx1 is applied to the liquid crystal layer of the sub-pixel A. At this time, since the potential is divided according to the capacitance ratio of the liquid crystal capacitance C1c2 and the control capacitance Cc, a voltage different from that of the pixel electrode 16 is applied to the pixel electrode 17 of the sub-pixel B. A voltage Vpx2 applied to the liquid crystal layer of the sub-pixel B becomes Vpx2=(Cc/(C1c2+Cc))×Vpx1. Here, because of 0<(Cc/(C1c2+Cc))<1, |Vpx1|>|Vpx2| is established except when Vpx1=Vpx2=0 is established. As stated above, in the liquid crystal display device of this embodiment, the voltage Vpx1 applied to the liquid crystal layer of the sub-pixel A and the voltage Vpx2 applied to the liquid crystal layer of the sub-pixel B can be made different from each other in one pixel. By this, since the distortion of the T-V characteristic is dispersed in one pixel, the phenomenon in which the color of an image looks whitish when viewed from an oblique direction can be suppressed, and the viewing angle characteristic is improved.

For improvement of alignment, singularity controlling openings 50 and 51 to control a position of a singularity of an alignment vector of the liquid crystal 6 are formed in a part of a region overlapping with the linear protrusion 42 when viewed vertically to the substrate surface. The opening 50 is formed by partially removing the pixel electrode 17 of the sub-pixel B, and the opening 51 is formed by partially removing the pixel electrode 16 of the sub-pixel A. For example, the width of each of the openings 50 and 51 is about 5 μm, and the length is about 15 μm. The longitudinal directions of the openings 50 and 51 are almost perpendicular to, for example, the direction in which the linear protrusion 42 extends. At least one opening 50 is provided in the sub-pixel B, and at least one opening 51 is provided in the sub-pixel A.

Besides, a second TFT 60 is provided in order to discharge an unnecessary storage charge as a cause of image sticking of the sub-pixel B. The gate bus line 12 serves also as a gate electrode of the TFT 60. An operational semiconductor layer (not shown) is formed on the gate electrode, and the channel protection film 28 is formed on the operational semiconductor layer. A source electrode 62 and a drain electrode 63 are formed on the channel protection film 28. The sub-pixel B is electrically connected to the source electrode 62 through a contact hole 64, and a portion extending from the control capacitance electrode 25 forms the drain electrode 63. The second TFT 60 is turned ON just before a specified voltage is written by the first TFT 20 into each of the pixel electrodes 16 and 17, and the pixel electrodes 16 and 17 are electrically connected to each other. Since the specified voltage is written into the pixel electrode 16 by the first TFT 20, an unnecessary charge is not cumulatively stored in the pixel electrode 17, and image sticking is prevented.

Figure 3:
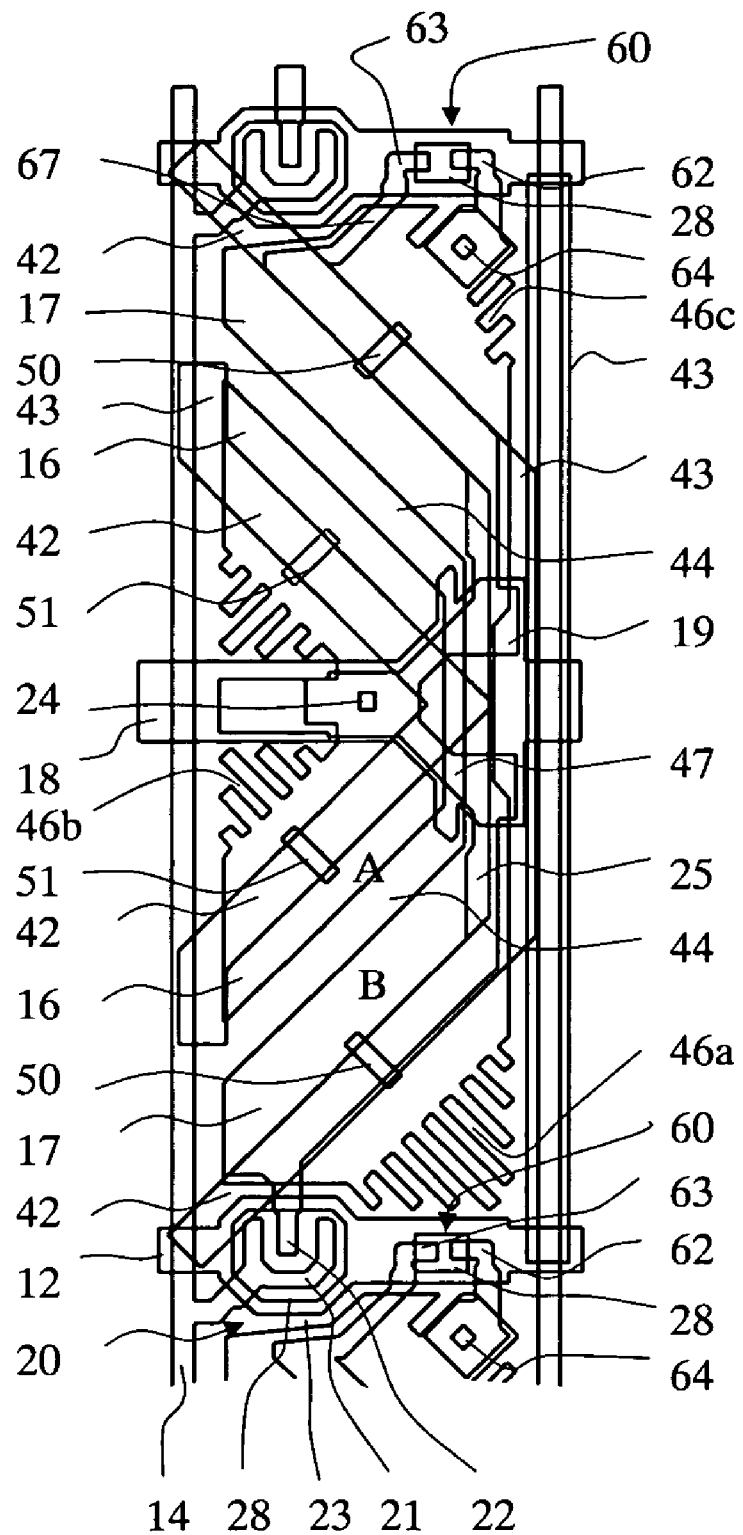
FIG. 3 is a view showing a rough structure of a pixel of a conventional liquid crystal display device in which image sticking is avoided by using a second TFT.

In this embodiment, a triangular alignment control electrode 65 is disposed in a place where the minute slit 46a exists in the conventional structure of FIG. 3. The alignment control electrode 65 is electrically connected to the source electrode 62 of the second TFT 60 provided between sub-pixels A and B of the adjacent pixel. A slit 48 is formed between the alignment control electrode 65 and the pixel electrode 17a. An extension part 66a of the alignment control electrode 65 crosses the gate bus line 12 and is electrically connected to the pixel electrode 17c through the contact hole 64. The alignment control electrode 65 has effects to stabilize the alignment of liquid crystal molecules in two points.

The first effect is that a distance in which the tilt of liquid crystal molecules is propagated is shortened to prevent the liquid crystal molecules from being tilted in a direction other than a specified direction. In the conventional structure of FIG. 3, although the minute slit 46a is provided, since the distance in which the tilt of liquid crystal molecules is propagated is long, the alignment is disturbed. On the other hand, in this embodiment, since the slit 48 is formed, the distance in which the tilt of liquid crystal molecules is propagated becomes short, the liquid crystal molecules are not tilted in a direction other than a specified direction, and the alignment is stabilized.

The second effect is obtained by a lateral electric field between the alignment control electrode 65 and the pixel electrode 17a. When dot inversion drive is performed, in case the common electrode 41 has a reference potential, the potentials of the alignment control electrode 65 and the pixel electrode 17a are in a relation of reverse polarity. Accordingly, the lateral electric field having a potential difference at least twice as high as the black voltage is always generated between the alignment control electrode 65 and the pixel electrode 17a. By this lateral electric field, the liquid crystal molecules on the slit 48 keep a state where they stand in the vertical direction to the substrate. Even if liquid crystal molecules are tilted in a direction different from a specified direction, the propagation thereof does not pass the slit 48. In order that the tilt of liquid crystal molecules is propagated, a vertical electric field must be generated between the common electrode 41 and the pixel electrodes 16 and 17 so that a force to tilt the liquid crystal molecules is applied. However, since the force to tilt is not exerted on the liquid crystal molecules in the lateral electric field, the liquid crystal molecules are not tilted, and accordingly, the tilt direction can not also be propagated. Especially, since the gate bus line has generally a potential lower than that of the pixel electrode by several volts to ten and several volts, in the vicinity of the gate bus line, the lateral electric field is generated in a direction different from the specified alignment direction, and the liquid crystal molecules are tilted in the direction different from the specified direction. However, the propagation thereof is blocked by the slit 48, and the alignment of the liquid crystal molecules on the pixel electrode 17a is stabilized.

In this embodiment, a slit 49 is formed between the pixel electrode 17c in which the contact hole 64 is formed and the pixel electrode 17b. In the conventional pixel shown in FIG. 3, in the contact hole 64 portion, the distance from the linear protrusion 42 is long, and the minute slit 46c is not provided, and therefore, the tilt direction of the liquid crystal is significantly disturbed. On the other hand, the distance in which the tilt of liquid crystal molecules is propagated is shortened by the slit 49, and the liquid crystal molecules are prevented from being tilted in a direction other than the specified direction. Besides, the propagation of the disturbance of alignment of liquid crystal molecules in the vicinity of the contact hole 64 can be prevented by the slit 49.

In this embodiment, an extension part 67 of the control capacitance electrode 25 is formed in a shape along the outer shape of the pixel electrode 17b in the vicinity of the gate electrode 23 and in the inside of the pixel electrode 17b, and is electrically connected to the drain electrode 63 of the second TFT 60. Since the control capacitance electrode 25 or 67 is a metal layer and does not allow light to pass through, it is desirable that the area occupying in the inside of the pixel electrode 17 is small. On the other hand, although the end of the pixel electrode 17 in the vicinity of the extension part 67 has a shape to surround the periphery of the gate electrode 23, the electric field generated by this portion has a direction different from the electric field to realize a desired alignment direction above the pixel electrode 17b. Accordingly, the alignment of liquid crystal molecules is disturbed in the vicinity of the extension part 67, and a dark line is generated. Accordingly, a decrease in brightness due to the extension part 67 hardly occurs.

In this embodiment, a portion of the gate bus line 12 facing the alignment control electrode 65 and the pixel electrode 17a has no roughness. The effect due to this is as follows. Since the alignment of liquid crystal molecules is disturbed according to the roughness of the gate bus line 12, it is desirable that the gate bus line 12 has the simplest possible shape. However, since it is necessary to widen the width of the gate bus line 12 in order to form the gate electrode 23, it can not be avoided that the roughness is generated in a portion of the gate bus line 12. On the other hand, the contact hole 64 has a size not lower than a specific value (for example, 10 microns), and as the distance from the gate bus line becomes large, the area of the pixel electrode 17b becomes small. Then, the pixel electrode 17c necessary for the formation of the contact hole 64 and the protrusion of the data bus line 12 are combined, and a reduction in aperture ratio is suppressed to the minimum, and at the same time, the side of the gate bus line 12 facing the alignment control electrode 65 is made linear, so that the disturbance of alignment can be suppressed to the minimum.

Second Embodiment

Figure 6:
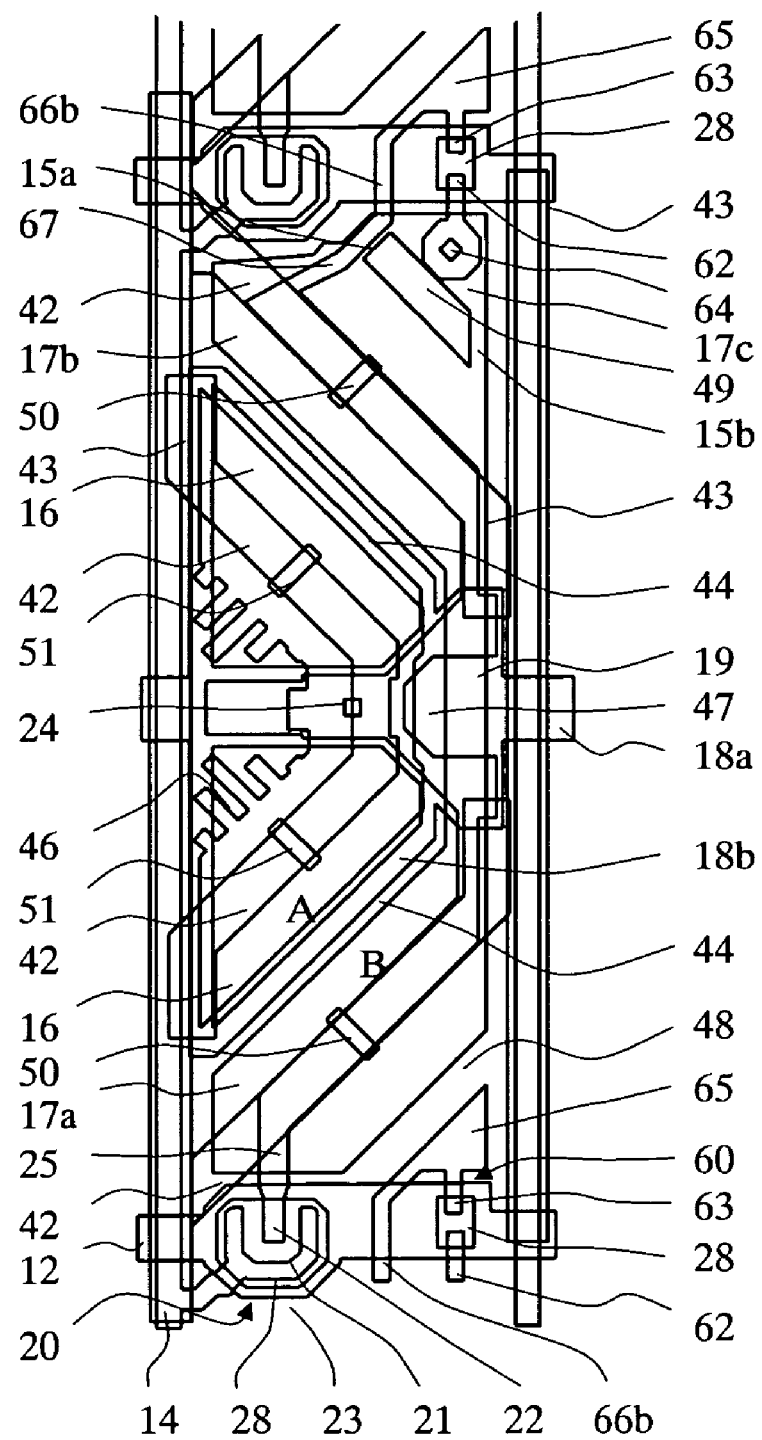
FIG. 6 is a view showing a rough structure of a pixel of a liquid crystal display device of a second embodiment of the invention.

Next, a liquid crystal display device of a second embodiment of the invention will be described with reference to FIG. 6. FIG. 6 shows a structure of one pixel and part of upper and lower pixels adjacent thereto in the liquid crystal display device of this embodiment. As shown in FIG. 6, in this embodiment, differently from the first embodiment (see FIG. 4), a re-extension part 66b of an extension part 67 of a control capacitance electrode 25 strides across a gate bus line 12, and is electrically connected to an alignment control electrode 65 of an adjacent pixel. The alignment control electrode 65 is electrically connected to a drain electrode 63 of a second TFT 60. On the other hand, a contact hole 64 is electrically connected to a source electrode 62 of the second TFT 60.

At the instance when the gate bus line 12 to drive the second TFT 60 comes to have an OFF voltage, potentials of both sub-pixels A and B are decreased by a capacitance between each of the sub-pixels A and B and the gate bus line 12. Immediately thereafter, a potential is newly written by the first TFT 20 into the sub-pixel A, and the influence of the gate bus line 12 to drive the second TFT almost disappears. However, in the sub-pixel B, a potential is merely newly determined by capacitive dividing through the control capacitance electrode 25, and the information of the potential decreased just before remains. Thus, when a capacitance between the sub-pixel B and the gate bus line 12 to drive the second TFT 60 is large, a shift in the amplitude center of potential of each of the sub-pixel A and the sub-pixel B becomes large, and a decrease in display quality, such as flicker or image sticking, is caused.

In this embodiment, the contact hole 64 is directly connected to the source electrode 62 of the second TFT. By this, a capacitance formed between the extension part 66a and the gate bus line 12 disappears, and a capacitance between the gate bus line 12 to drive the second TFT and the sub-pixel A becomes minimum. On the other hand, although the extension part 66b newly generates a capacitance between itself and the gate bus line 12, since the extension part 66b is connected to the sub-pixel B, a decrease in potential hardly occurs by the writing of the first TFT.

Third Embodiment

Figure 1:
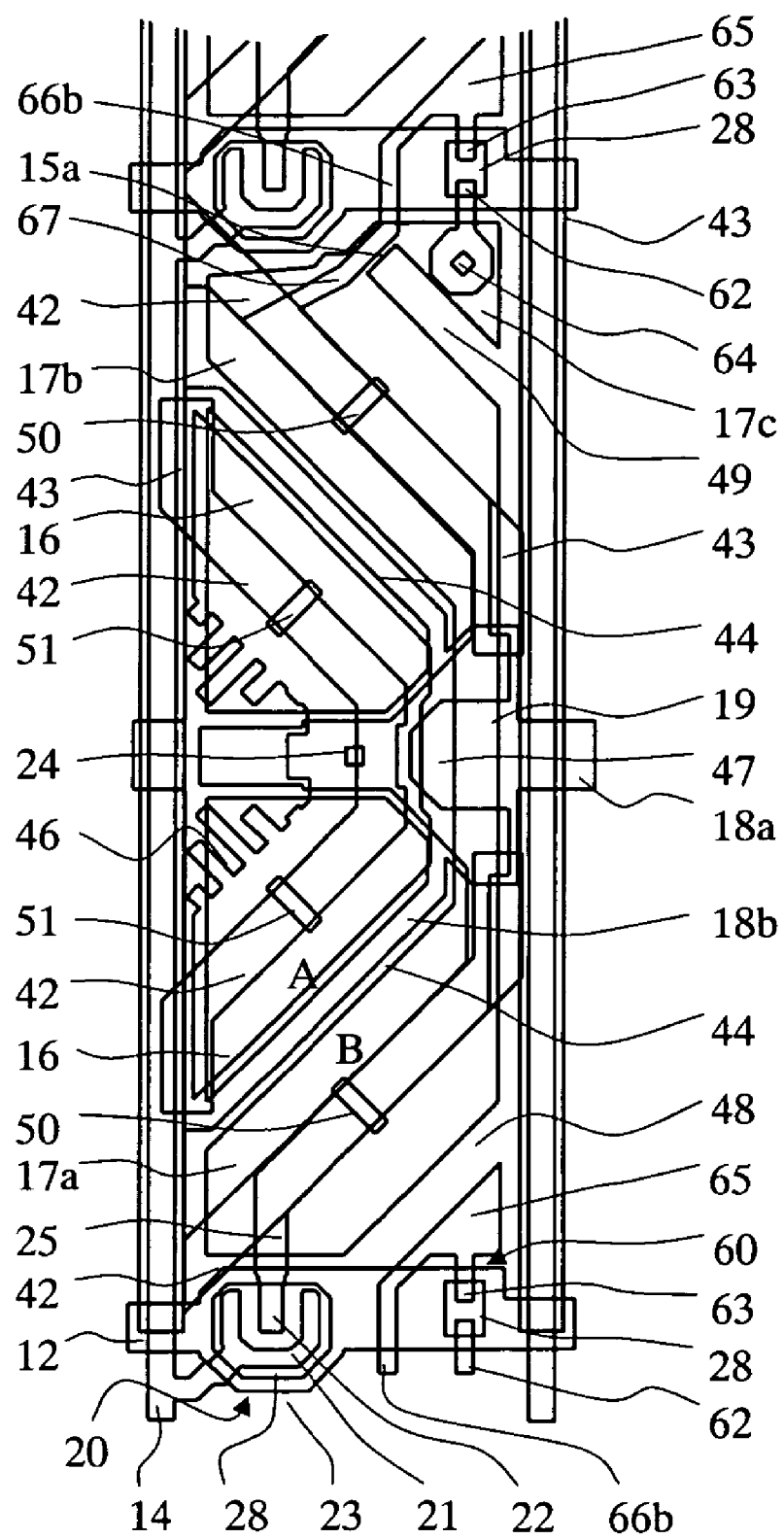
FIG. 1 is a view showing a rough structure of a pixel of a liquid crystal display device by way of principle explanation of the invention.
Figure 2:
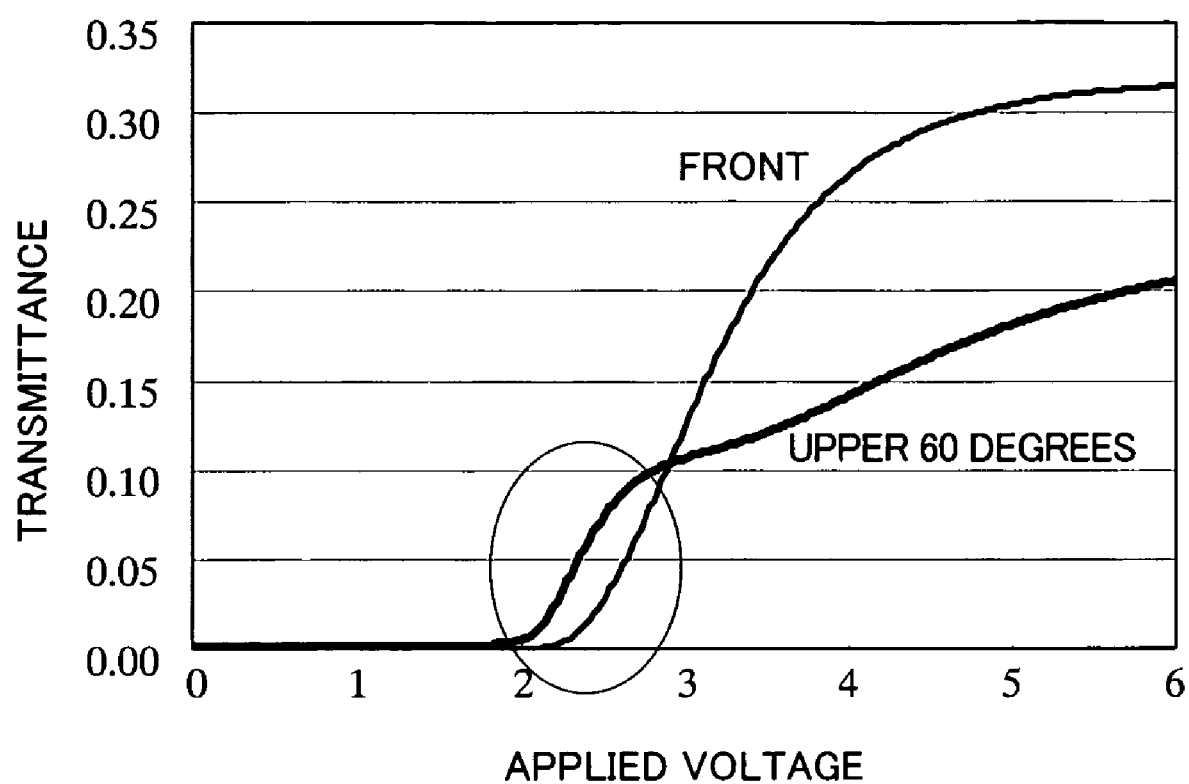
FIG. 2 is a view showing T-V characteristics of a conventional MVA when viewed from the front and from an upward direction of 60 degrees.
Figure 8:
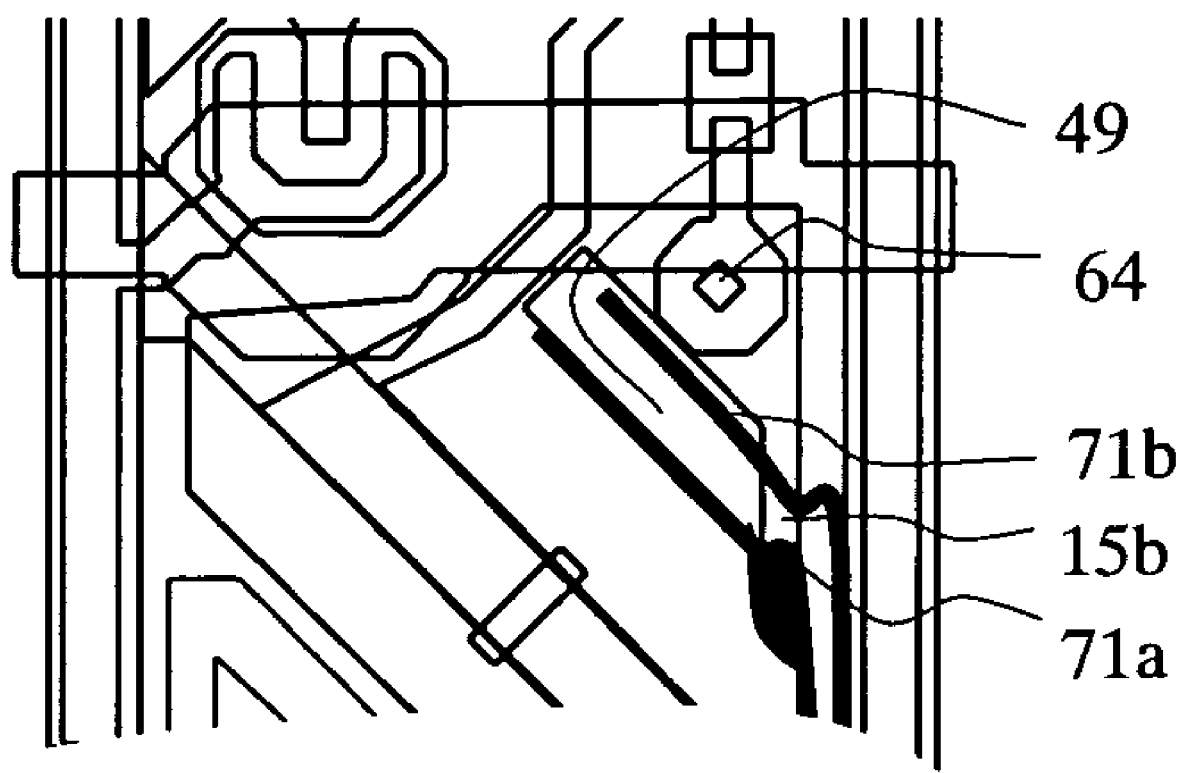
FIG. 8 is a view schematically showing a portion of a pixel of a liquid crystal display device of a first or a second embodiment of the invention and a dark line.
Figure 9:
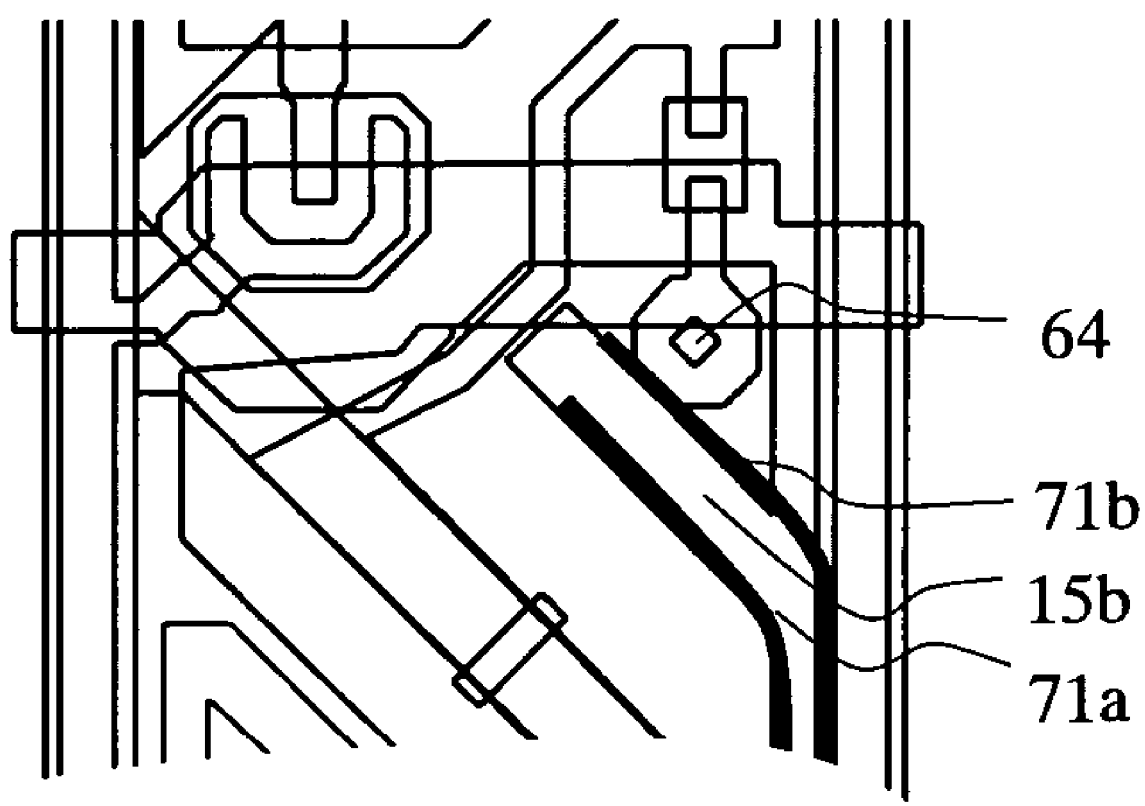
FIG. 9 is a view schematically showing a portion of a pixel of the liquid crystal display device of the third embodiment of the invention and a dark line.

Next, a liquid crystal display device of a third embodiment of the invention will be described with reference to FIGS. 8 and 9. In this embodiment, differently from the first and the second embodiments, a portion 15b to connect a pixel electrode 17b and a pixel electrode 17c is eliminated, and a slit 49 has such a shape that one side is opened. FIG. 8 is a view in which the vicinity of the slit 49 of FIG. 6 is enlarged and a dark line generated in the vicinity of the slit 49 is schematically shown. FIG. 9 is a view in which the vicinity of the slit 49 of FIG. 1 is enlarged and a dark line generated in the vicinity of the slit 49 is schematically shown. In the pixel electrode shape in which a connection portion 15b shown in FIG. 8 exists, dark lines 71a and 71b undulate and enter the inside of the pixel electrode 16, and a dark region is also generated. However, when there is no connection portion 15b as shown in FIG. 9, shapes of dark lines 71a and 71b become simple shapes along the pixel electrode 16, and remain in the inside of the slit 49. As a result, the stability of alignment is improved.

What is claimed is:

1. A liquid crystal display device comprising:
   a first and a second substrates disposed to be opposite to each other;
   a liquid crystal sealed between the first and the second substrates;
   a first gate bus line formed on the first substrate and a first data bus line disposed in a direction substantially perpendicular to the gate bus line;
   a first TFT connected to the gate bus line and the first data bus line;
   first and second spaced apart sub-pixel electrodes formed in a pixel region defined by the first gate bus line and the first data bus line, the first sub-pixel electrode electrically connected to the first TFT and the second sub-pixel electrode in a floating state and capacitively coupled to a control electrode;

the control electrode which is capacitance coupled to the second sub-pixel electrode, and wherein display voltage is applied to the control electrode from the first data bus line through the first TFT;

a second TFT which is driven by a second gate bus line different than the first gate bus line, a source of the second TFT being electrically connected to the second sub-pixel electrode of the first pixel region; and wherein an alignment control electrode is provided primarily in a second pixel region defined by the second gate bus line and the first data bus line, the second pixel region being different than the first pixel region, wherein the alignment control electrode is electrically connected to the source of the second TFT and also to the second sub-pixel electrode of the first pixel region, so that the alignment control electrode in the second pixel region has a same potential as the second sub-pixel electrode of the first pixel region which is in an adjacent pixel.

2. The liquid crystal display device according to claim 1, wherein a drain electrode of the second TFT is electrically connected to an extension portion of the control electrode.

3. The liquid crystal display device according to claim 1, wherein an extension portion of the control electrode is disposed at a periphery of a gate electrode of a first TFT of the second pixel region and in a shape along an outer periphery of the pixel electrode.

* * * * *